United States Patent [19]

Bitter et al.

[11] Patent Number: 5,133,851
[45] Date of Patent: Jul. 28, 1992

[54] PROCESS FOR REDUCING THE METAL CONTENT OF A HYDROCARBON MIXTURE

[75] Inventors: Johan G. A. Bitter, Amsterdam, Netherlands; Richard H. Clark, Chester, Great Britain; Johannes L. W. C. Den Boestert; Jayantilal B. Rajani, both of Amsterdam, Netherlands

[73] Assignee: Shell Oil Company, Houston, Tex.

[21] Appl. No.: 701,714

[22] Filed: May 17, 1991

[30] Foreign Application Priority Data

Jul. 25, 1990 [GB] United Kingdom ............... 9016270

[51] Int. Cl.$^5$ .................. C02F 1/44; C10G 17/00; B01D 61/02; C07C 7/144
[52] U.S. Cl. ................ 208/251 R; 208/310 R; 210/652; 210/653; 585/818
[58] Field of Search ............. 208/251 R, 310 R; 585/818; 210/652, 653

[56] References Cited

U.S. PATENT DOCUMENTS

| 3,440,264 | 4/1969 | McVannel | 208/308 |
| 4,748,288 | 5/1988 | Bitter et al. | 585/818 |
| 4,750,990 | 6/1988 | Kulkarni et al. | 208/251 R |
| 4,814,088 | 3/1989 | Kutowy et al. | 210/651 |

FOREIGN PATENT DOCUMENTS 0217534  4/1987  European Pat. Off.

Primary Examiner—Theodore Morris
Assistant Examiner—P. L. Hailey

[57] ABSTRACT

Process for reducing the metal content of a hydrocarbon feed mixture by reverse osmosis, comprising contacting the feed mixture substantially boiling in the range between about 100° and about 350° C. and containing at most about 1000 parts per billion by weight (ppbw) of metal(s) with a metal-selective membrane to give a hydrocarbon permeate stream having a metal content which is less.

8 Claims, No Drawings

PROCESS FOR REDUCING THE METAL CONTENT OF A HYDROCARBON MIXTURE

FIELD OF THE INVENTION

The present invention relates to a process for reducing the metal content of a hydrocarbon feed mixture substantially boiling in the range between about 150° and 330° C. and containing at most about 1000 parts per billion on weight (ppbw) of metals.

BACKGROUND OF THE INVENTION

Hydrocarbon mixtures boiling in the kerosine range can be applied as fuel for aviation turbines; hydrocarbon mixtures boiling in the gas oil range can be used as a source of diesel engine fuel. It is important that the heating of such fuels does not cause the fuel to degrade and form tenacious deposits within the fuel system as this would ultimately lead to reduction of the life time of components such as oil-coolers, fuel control units and injector feed nozzles. Therefore, in order to be applicable in engines, the kerosine and gas oil fractions must have a very low metal content, especially a low copper and/or iron content, as (these) metals are considered to catalyze such deposition. Another compound which should not be present in fuels is water, as it can form acids with some impurities such as sulphur compounds. This causes rust and corrosion of tanks, lines and engines. Further, the presence of water in kerosine can lead to ice-formation.

It is known to use membranes, such as polysiloxane-type membranes, for separating various hydrocarbon compounds from each other, which compounds are present in considerable quantities and/or which compounds differ greatly from each other in molecular weight, chemical and/or physical properties. Such application is e.g. described in U.S. Pat. No. 4,810,366. From this patent it is known to separate hydrocarbon fluids such as lubricating base oils, from solvents using a hydrocarbon oil-selective membrane. The hydrocarbon fluids may include kerosine and gas oil. Suitable solvents include furfural and toluene.

In German Patent Application No. 2,741,486 a membrane is disclosed for the separation of water from hydrocarbons such as kerosine. The membrane comprises a random copolymer of a first monomer consisting of acrylic acid and/or methacrylic acid, and of a second monomer selected from the group consisting of acrylic acid, methacrylic acid, maleic acid and maleic anhydride.

Surprisingly, it has now been found that low concentration of metal compounds in gas oil and kerosine fractions, can be lowered further with the help of metal-selective membranes. Furthermore, it has been found that the permeate fractions obtained had a lower water content.

SUMMARY OF THE INVENTION

Therefore, the present invention provides a process for reducing the metal content of a hydrocarbon feed mixture by reverse osmosis, comprising contacting the feed mixture substantially boiling in the range between about 100° and about 350° C. and containing at most about 1000 parts per billion by weight (ppbw) of metal(s) with a metal-selective membrane to give a hydrocarbon permeate stream having a metal content which is less, on weight basis, than the metal content of the feed mixture.

DETAILED DESCRIPTION OF THE INVENTION

In a reverse osmosis process a difference in hydraulic pressure between both sides of the membrane is maintained as the driving force.

In the present process various types of membrane units may be applied, such as a flat sheet or a tubular membrane unit. Modules in which flat membranes are packed between flat support layers are less attractive as they have a limited packing density ($m^2$ membrane/$m^3$ apparatus). Preference is given to the application of modules containing spirally wound- or hollow fiber membranes which have a high packing density. Suitably, metal-selective membrane layers are applied having a permeability of more than about 50 $l/m^2.day.bar$, suitably between about 100 and 250 $l/m^2.day.bar$.

The pressure difference applied between the one side of the membrane contacted with the feed mixture and the other (permeate) side is suitably between about 2 and 200 bar, and preferably between about 10 and 80 bar. The temperature at which the present process is carried out may vary within a wide range and is not critical as long as the applied membranes can withstand the operating conditions. Suitably, temperatures between about $-30°$ and 300° C. are applied, preferably between about $-20°$ and 130° C.

Various metal-selective membranes are suitable for use in the present process, e.g. rubbers, polystyrene, polybutadiene or copolymers of styrene and butadiene. It has been found that an especially suitable metal-selective membrane comprises a layer of a silicone polymer comprising units according to the general formula:

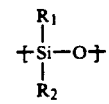

wherein $R_1$ and $R_2$ represent moieties chosen from the group consisting of hydrogen, halogen, alkyl, aryl and aralkyl moieties. Particularly preferred is a process wherein the silicone polymer applied is chosen from the group consisting of polydimethylsiloxane, poly(3,3,3)-trifluoropropylmethylsiloxane and poly-1-trimethylsilylpropyne.

The metal-selective membrane layer preferably has a thickness of between about 0.5-100 micrometer, and most preferably about 1-10 micrometer in order to attain relatively high permeate fluxes therethrough.

Suitably, the metal-selective membrane is supported by a porous support such as cloth, wire net or glass fibers. A porous polypropylene or polyimide support layer is preferred. It may be advantageous to apply an extra layer between the metal-selective layer and the porous support, which layer is to be highly permeable and is to have a good bonding capacity for both the selective layer and the support.

The process according to the invention is suitable for reducing the metal content of feed mixtures containing at most about 1000 ppbw of metal(s); higher amounts of metal(s) are economically more attractively removed by conventional catalytic demetallization processes, such as treatment with clay filters. The metal content of hydrocarbon mixtures containing very small amounts of metal(s) is reduced, such as hydrocarbon mixtures containing at most about 600 ppbw of metal(s). Metal(s) which may be present in hydrocarbon mixtures include iron, copper, calcium and sodium; also silicon may be present. Feed mixtures which are suitably subjected to metal removal according to the present invention contain at most about 300 ppbw of copper and/or about 300 ppbw of iron. In the present process the metal content of the permeate mixture obtained, can be less than about 60% on weight basis than the metal content of the feed mixture. Advantageously, the process is carried out such that the metal content of the permeate mixture is less than about 50% wt of the metal content of the feed mixture. Further, in the process the amount of water present in the permeate is suitably decreased to less than about 85% on weight basis of the amount of water present in the hydrocarbon feed mixture, preferably to less than about 80% wt of the water in the feed mixture.

Hydrocarbon mixtures boiling in the range between about 100° and 350° C. are to be treated in the present process, suitably hydrocarbon mixtures boiling in the range between about 150° and 350° C., preferably between about 150° and 300° C. A gas oil fraction substantially boiling in the range between 175° and 330° C. can suitably be subjected to the present process. It is especially attractive to treat a kerosine fraction substantially boiling in the range between 150° and 300° C. Suitably, the hydrocarbon mixture substantially consists of a kerosine and/or gas oil fraction boiling in said range.

In the process a hydrocarbon retentate fraction is obtained having a greatly enhanced metal content. In order to operate economically, it is preferred that as permeate a product is obtained comprising at least about 70% wt of the hydrocarbon feed mixture, preferably between 80 and 99% wt.

Membrane layers comprising a silicone compound suitable for use in the present process may be prepared by any method known in the art. Suitable methods are spray- or dip-coating techniques, which involve forming a solution of a polymer or a prepolymer of the desired membrane compound in a solvent and spraying the solution onto a support or to dip the support into the solution, to produce a thin layer which is subsequently dried by evaporation of the solvent. Most preferably, a prepolymer solution of dimethyl siloxane in iso-octane is used. A specific preparation method which can suitably be applied is described in co-pending Ser. No. 321,596, filed Mar. 10, 1989.

The present process can be applied in a single- or multi-step operation.

Suitably, the process according to the present invention is applied to a jet fuel just before or during fuelling of an airplane, e.g. from a tank or truck containing a reverse osmosis membrane separation unit.

The following example illustrates the invention.

EXAMPLE

A kerosine feed fraction had a boiling range of from 120° to 250° C. and contained 920 parts per million by weight (ppmw) of water and 174 ppbw of metals, of which 160 ppbw was copper and 14 ppbw was iron. This kerosine fraction was contacted at a pressure of 25 bar and a temperature of 25° C. with a non-porous polydimethylsiloxane membrane layer supported by a porous polypropylene layer having slit-shaped pores of 0.02×0.2 micrometer. The permeate obtained had a metal content of 74 ppbw of which 67 was copper and 7 ppbw was iron, and contained 680 ppmw water.

What is claimed as the invention is:

1. A process for reducing the metal content of a feed mixture by reverse osmosis across a membrane having a feed side and a permeate side which process comprises contacting the feed mixture consisting essentially of a kerosine range mixture or gas oil range mixture substantially boiling in the range between 100° C. and 350° C. and containing at most 1000 parts per billion by weight (ppbw) of metals(s) with a metal-selective membrane to give a permeate mixture having a metal content which is less, on weight basis, than the metal content of the feed mixture, wherein the contacting occurs at a pressure difference between the feed and permeate sides of the membrane of between 2 bar and 200 bar and a temperature between −30° C. and 300° C., and wherein the metal content of the permeate mixture is less than 60%, on weight basis, of the metal content of the feed mixture.

2. The process according to claim 1, wherein the metal-selective membrane comprises a layer of a silicone polymer comprising units according to the general formula:

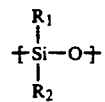

wherein $R_1$ and $R_2$ represent moieties chosen from the group consisting of hydrogen, halogen, alkyl, aryl and aralkyl moieties.

3. The process according to claim 2, wherein the silicone polymer is chosen from the group consisting of polydimethylsiloxane, poly(3,3,3)-trifluoropropylmethylsiloxane, and admixtures thereof.

4. The process according to claim 1, wherein the feed mixture is a kerosine fraction substantially boiling in the range between 150° and 300° C.

5. The process according to claim 1 wherein the permeate has a water content less than about 85% wt. of the water content of the feed.

6. In a process for the purification of a hydrocarbon feed mixture by reverse osmosis, consisting essentially of contacting said hydrocarbon feed mixture with a membrane having a feed side and permeate side and comprising a layer of silicone polymer comprising units according to the general formula:

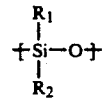

wherein $R_1$ and $R_2$ represent moieties chosen from the group consisting of hydrogen, halogen, alkyl, aryl and aralkyl moieties, to give a purified hydrocarbon permeate stream, the improvement which comprises obtaining a hydrocarbon permeate mixture with decreased content of metal(s) by contacting with said membrane a hydrocarbon feed mixture that substantially consists of a kerosine fraction boiling in the range from 150° C. to 300° C. and containing up to 1000 ppbw of metal(s), wherein the contacting occurs at a pressure difference between the feed and permeate sides of the membrane of between 2 bar and 200 bar and a temperature between −30° C. and 300° C., and wherein the permeate metal content is less than 60%, on weight basis, of the metal content of the feed mixture.

7. The process according to claim 6, wherein the silicone polymer is chosen from the group consisting of polydimethylsiloxane, poly(3,3,3)-trifluoropropylmethylsiloxane and poly-1-trimethylsilylpropyne.

8. The process according to claim 7, wherein the silicone polymer is a polydimethylsiloxane.

* * * * *